Figure 1:
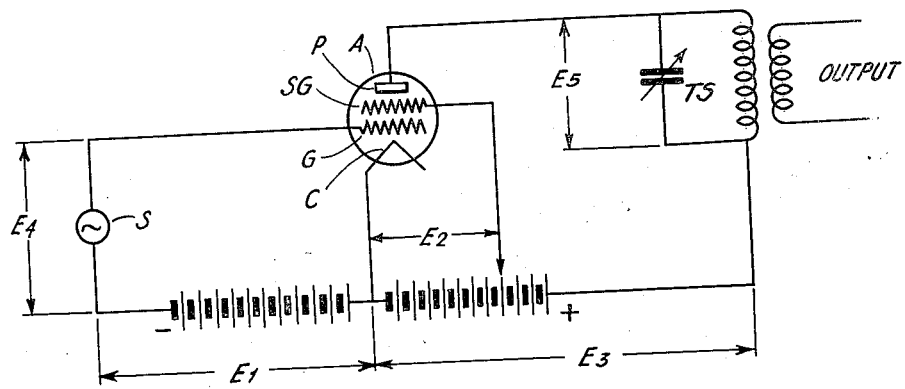

Jan. 15, 1935.                G. JOBST                1,987,684
                   ELECTRON DISCHARGE DEVICE CIRCUIT
                        Filed May 13, 1933

INVENTOR
GUNTHER JOBST
BY
ATTORNEY

Patented Jan. 15, 1935

1,987,684

UNITED STATES PATENT OFFICE 1,987,684

ELECTRON DISCHARGE DEVICE CIRCUIT

Gunther Jobst, Berlin, Germany, assignor to Telefunken Gesellschaft für Drahtlose Telegraphie m. b. H., Berlin, Germany, a corporation of Germany Application May 13, 1933, Serial No. 670,834
In Germany May 13, 1932

2 Claims. (Cl. 179—171)

In transmitter tubes, in the presence of complete modulation (100%), especially where the useful resistance is adapted or over-adapted, operation takes place in the presence of over-voltage, in other words, during the periodic intervals between maximum positive grid alternating potential, the plate voltage falls below the grid potential. At that instant the grid should "convey" the maximum instantaneous value of plate current. Instead of that, it takes current, diminishes the plate power, and raises the grid energy to be expended considerably. It is particularly for this latter reason that the grid powers become frequently disproportionately high with an incidental impairment of the modulation curves.

The reasons underlying this condition are primarily traceable to two facts. In the first place, the plate gives off secondary electrons whenever the grid voltage exceeds the plate voltage and these secondary electrons act like an additional grid current. In the second place, a spacecharge is produced between grid and cathode as the plate voltage decreases, and this spacecharge has the same effect as a negative grid mounted between grid and plate, whereby the distribution of current between grid and plate is affected in favor of the former.

Means adapted to prevent the emission of secondary electrons by the plate or means designed to preclude the passage of secondary electrons from the plate to the grid are known in the prior art, in fact, they consist in a chemical treatment of the plate or in the disposition of a grid serving as a potential "threshold" kept at zero or at negative potential.

In order to avoid the second effect, namely, the development of a space-charge tending to promote the transfer of plate current to the grid, there would be required a means having an action just the opposite of the potential threshold grid before mentioned. Between grid and plate a grid should be arranged having a constant and positive voltage. The amount of the said potential is governed by factors which have been utilized and mentioned for other purposes in my copending patent application, Serial No. 667,244, filed April 26, 1933. While in this latter instance the point was to promote the production of a space-charge in front of the plate because the tube, in a state as there described, exhibits a maximum stopper effect for the plate current, the practical inference to be drawn therefrom so far as the object of the present invention is concerned would be just the avoidance of the said condition, and this, in the light of what has been pointed out is accomplishable by providing an accelerator grid with such a high voltage that such space-charge formation will not arise at all. Hence, it is advisable to mount a further grid between the control grid properly so-called and a "collector" grid possibly provided for the preclusion of secondary emission, the voltage of the former to be chosen so high that, no matter what the voltage state of the control grid and the plate coming into consideration for the transmitter tube, an accumulation of electrons in this state is prevented, the criterion in this connection being that, in the presence of constant plate potentials corresponding to the various phases of operation no decrease in plate current should happen in the presence of a growth of aggregate current due to variation of the control-grid potential. Since this presumably is most critical at the lowest plate potentials coming into consideration, this instruction will suffice that the accelerator grid, in other words, the second grid figuring from the filament should be positively biased so that at the lowest plate potential coming into consideration no decrease of plate current upon increase of the positive grid voltage will arise.

The same thing analogously holds good for the case where there is no collector grid mounted in front of the plate provided with a view to preclude the passage of secondary-electron emission, but where the plate, as pointed out above, is rendered inactive so far as secondary emission is concerned, by the aid of chemical influences.

Figure 2:
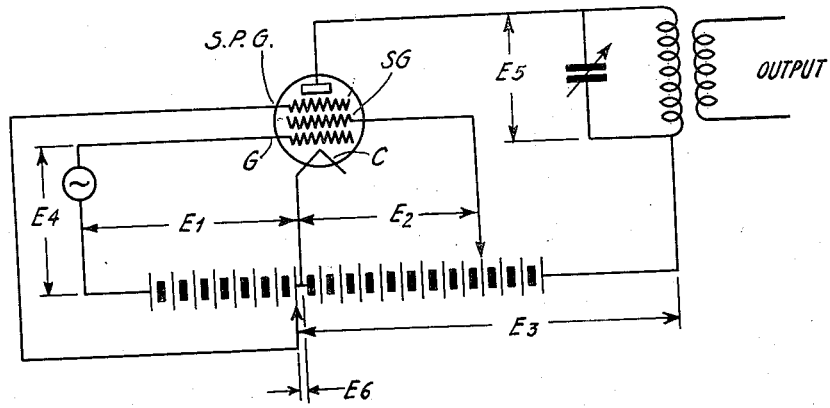

The present invention is more fully described in connection with the accompanying drawing wherein, Figure 1 illustrates the invention carried out utilizing the screen grid tube, and, Figure 2 illustrates an embodiment of the present invention wherein a pentode tube is utilized.

Turning to Figure 1, alternating currents or voltages to be amplified from a source S and having a value E4 are fed across the grid G and cathode C of screen grid tube amplifier A. Output energy is taken from the tuned circuit TS across which a voltage E5 is generated. When the grid G has impressed thereon a voltage E4 of a positive value such as to overcome the biasing voltage E1, the grid power, described above, becomes excessive and the plate current falls off considerably. To remedy this defect, the screen grid SG is maintained at a positive potential E2 equal in value to the highest positive potential impressed upon the grid G from voltage source S. In other words, the potential E2 is made equal to the highest positive value of source S minus the voltage E1. To prevent secondary emission the plate P may be treated for that purpose as pointed out hereinabove.

In Figure 2, an arrangement is shown whereby the secondary emission is prevented by the use of a suppressor grid SPG maintained at a small negative voltage E6 with respect to the cathode C. The screen grid SG is here maintained at a positive voltage E2 equal in value to the maximum positive voltage which the grid G swings relative to the cathode C.

Having thus described my invention, what I claim is:

1. In an amplification system comprising an electron discharge device having an anode, a cathode, a grid and a screen grid, a source of alternating electromotive-force connected between the grid and cathode, and an output circuit connected between the anode and cathode, the method of eliminating distortion when the grid swings positive due to impressed electromotive-forces which includes the step of maintaining said screen grid at a constant positive potential of a value substantially equal to the highest positive potential applied to said first grid by virtue of applied positive half cycles from the input electromotive-force.

2. In a communication system, a multi-electrode electron discharge device having in addition to a cathode, anode, and control grid, an auxiliary grid located intermediate said control grid and anode, a source of alternating potential in circuit with said control grid and cathode, an output circuit associated with said anode and cathode, and means for maintaining said auxiliary grid at a constant positive potential whose value is equal to the maximum positive potential attained by said control grid, due to the potential crests of said source of alternating potential.

GUNTHER JOBST.